US012502629B1

(12) United States Patent
Ota

(10) Patent No.: US 12,502,629 B1
(45) Date of Patent: Dec. 23, 2025

(54) MIST COLLECTION AND SEPARATION ASSEMBLY

(71) Applicant: Tomio Ota, Doral, FL (US)

(72) Inventor: Tomio Ota, Doral, FL (US)

(*) Notice: Subject to any disclaimer, the term of this patent is extended or adjusted under 35 U.S.C. 154(b) by 0 days.

(21) Appl. No.: 19/307,395

(22) Filed: Aug. 22, 2025

(51) Int. Cl.

| | |
|---|---|
| ***B01D 45/08*** | (2006.01) |
| ***B01D 21/26*** | (2006.01) |
| ***B01D 45/02*** | (2006.01) |
| ***B01D 45/06*** | (2006.01) |
| ***B01D 45/18*** | (2006.01) |
| ***B01D 46/12*** | (2022.01) |
| ***B01D 46/14*** | (2006.01) |
| ***B01D 50/20*** | (2022.01) |

(52) U.S. Cl.
CPC ............. *B01D 45/08* (2013.01); *B01D 45/02* (2013.01); *B01D 45/06* (2013.01); *B01D 45/18* (2013.01); *B01D 50/20* (2022.01)

(58) Field of Classification Search
CPC ........ B01D 45/08; B01D 45/02; B01D 45/06; B01D 45/18; B01D 50/20; B01D 39/14; B01D 45/14; B01D 45/12; B01D 17/0205; B01D 17/0211; B01D 17/0217; B01D 21/26; B01D 2221/04; F04D 29/703
USPC ........... 55/327, 441; 261/30; 60/311; 96/367
See application file for complete search history.

(56) References Cited

U.S. PATENT DOCUMENTS

2012/0111168 A1* 5/2012 Ota ........................ B01D 45/14
409/137

FOREIGN PATENT DOCUMENTS

CN 2482460 Y * 3/2002

* cited by examiner

*Primary Examiner* — Jennifer Dieterle
*Assistant Examiner* — Qianping He
(74) *Attorney, Agent, or Firm* — Ruben Alcoba, Esq.

(57) ABSTRACT

A mist collection and separation assembly is disclosed for improved operability and maintainability. The assembly includes a rotor disposed concentrically within a housing and powered by an electrical motor that generates suction, drawing mist from a target environment into a rotor interior cavity. The mist impacts a rotor surface and reverses direction, causing liquid and potential particulate content to separate due to inertia. Separated matter drains through designated housing ports, while clean air is exhausted. The assembly operates filter-free, reducing maintenance and cost. Vertical orientation enhances separation via gravity, and grooved rotor surfaces facilitate drainage. Wetted internal housing surfaces enable passive self-cleaning through molecular adhesion of submicron particles. Optional removable filters may be included for improved reliability.

12 Claims, 4 Drawing Sheets

MIST COLLECTION AND SEPARATION ASSEMBLY

BACKGROUND

In various industries where machinery utilizing coolants is employed—such as metalworking, machining, and manufacturing—it is common for the surrounding air to become contaminated with a fine mist. This mist is generated through the volatilization of coolant oils or liquids during normal machine operations. Prolonged exposure to coolant and oil mist has been identified as a significant occupational health hazard. Health risks associated with these exposures include respiratory irritation, asthma, bronchitis, hypersensitivity pneumonitis, dermatitis, and more serious long-term outcomes such as cancer. Scientific studies have demonstrated a link between exposure to metalworking fluids and increased cancer risk. Due to these well-documented health concerns, there is a clear need for effective solutions to remove coolant and oil mist from the air in industrial environments, thereby improving workplace safety and protecting workers' health.

Conventional mist collection systems typically rely on filter-based mechanisms to trap airborne contaminants. While effective, these systems often require frequent filter replacement, leading to increased operational costs, maintenance burdens, and dependence on consumable components. Additionally, many such systems require high-powered motors to generate sufficient suction, further contributing to energy consumption and mechanical complexity.

There remains a need for a mist collection and separation assembly that offers improved operability and maintainability, reduces reliance on filters, and enhances separation efficiency through innovative mechanical design. The present invention addresses these needs by providing a filter-free, energy-efficient assembly capable of effectively separating liquid and potential particulate content using rotor-induced suction and directional flow dynamics, while also incorporating passive self-cleaning features to minimize maintenance. The invention herein represents an improvement over the design disclosed in U.S. Pat. No. 8,580,008 to Ota.

SUMMARY

The primary objective of the present invention is to provide a system for collecting and separating mist—comprising air and liquid with potential particulate content—generated in industrial environments, without relying on conventional filtration methods. This system is particularly suited for removing coolant and oil from the air during machine operations, thereby improving air quality and reducing health risks for workers.

The invention leverages fundamental aerodynamic principles to achieve separation based on differences in inertia between the air and the denser liquid and potential particulate content suspended within the mist. Abrupt changes in flow direction within the assembly cause the lighter air to follow the new path, while the heavier liquid and potential particulate content are unable to adapt as quickly and are thereby separated from the airstream.

This approach results in significantly cleaner air existing in the assembly. Experimental validation confirmed effective removal of coolant and oil from the air, demonstrating the soundness of the underlying aerodynamic principles.

A preferred embodiment of the invention features a rotor housed within a cylindrical housing, powered by a single-phase ⅓ horsepower electrical motor operating at 50 hertz and 3,000 revolutions per minute. Angled paddles on a rotor lateral surface generate suction to draw mist from a target environment into a rotor interior cavity, where the mist impacts a rotor surface and reverses direction, which causes separation of the liquid and potential particulate content from the air. Grooved rotor surfaces facilitate drainage of the separated liquid and potential particulate content from the rotor interior cavity, and wetted internal housing surfaces enable passive self-cleaning of the assembly. Optional removable filters may be included to enhance reliability.

BRIEF DESCRIPTION OF THE DRAWINGS

These and other features, aspects, and advantages of the present invention will become better understood with regards to the following description, appended claims, and drawings where:

DESCRIPTION

Figure 1:
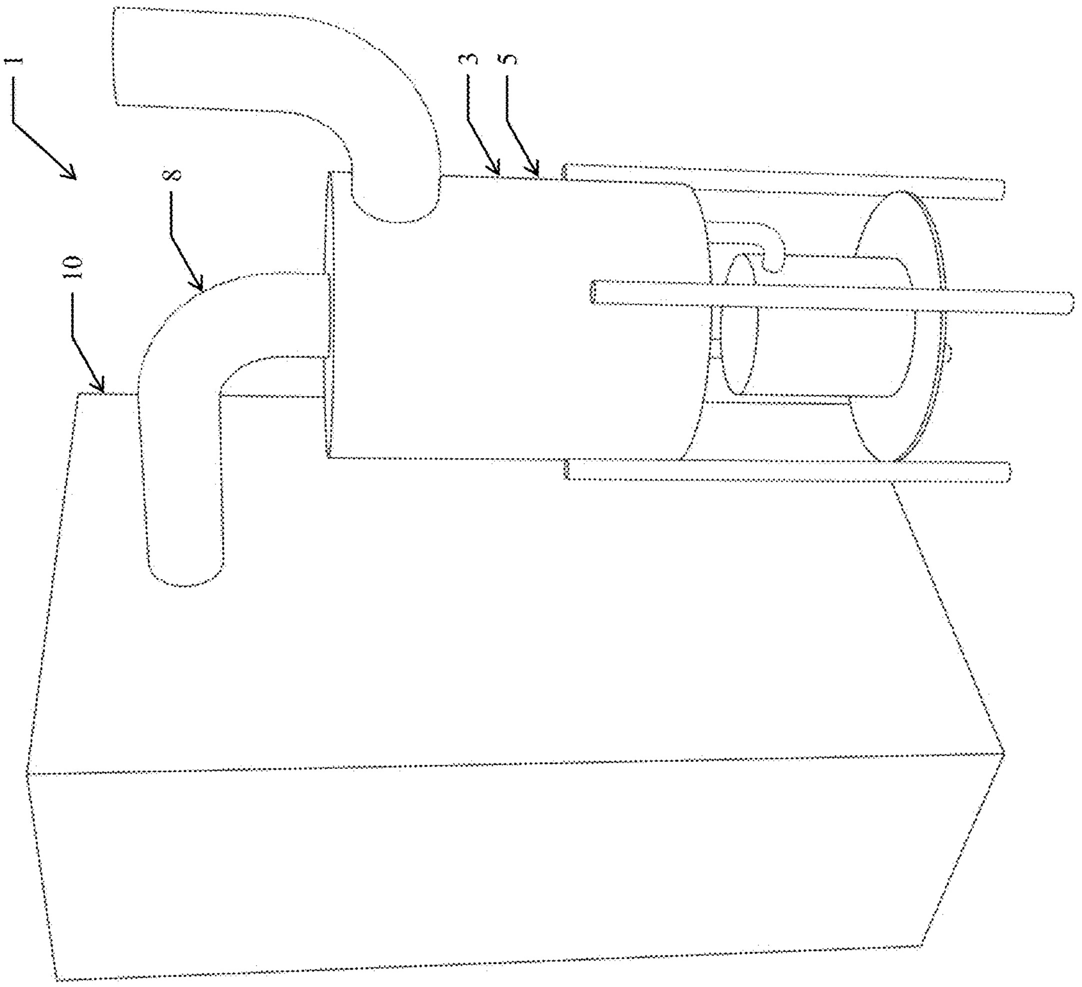
FIG. 1 is a perspective view of the present invention.
Figure 2:
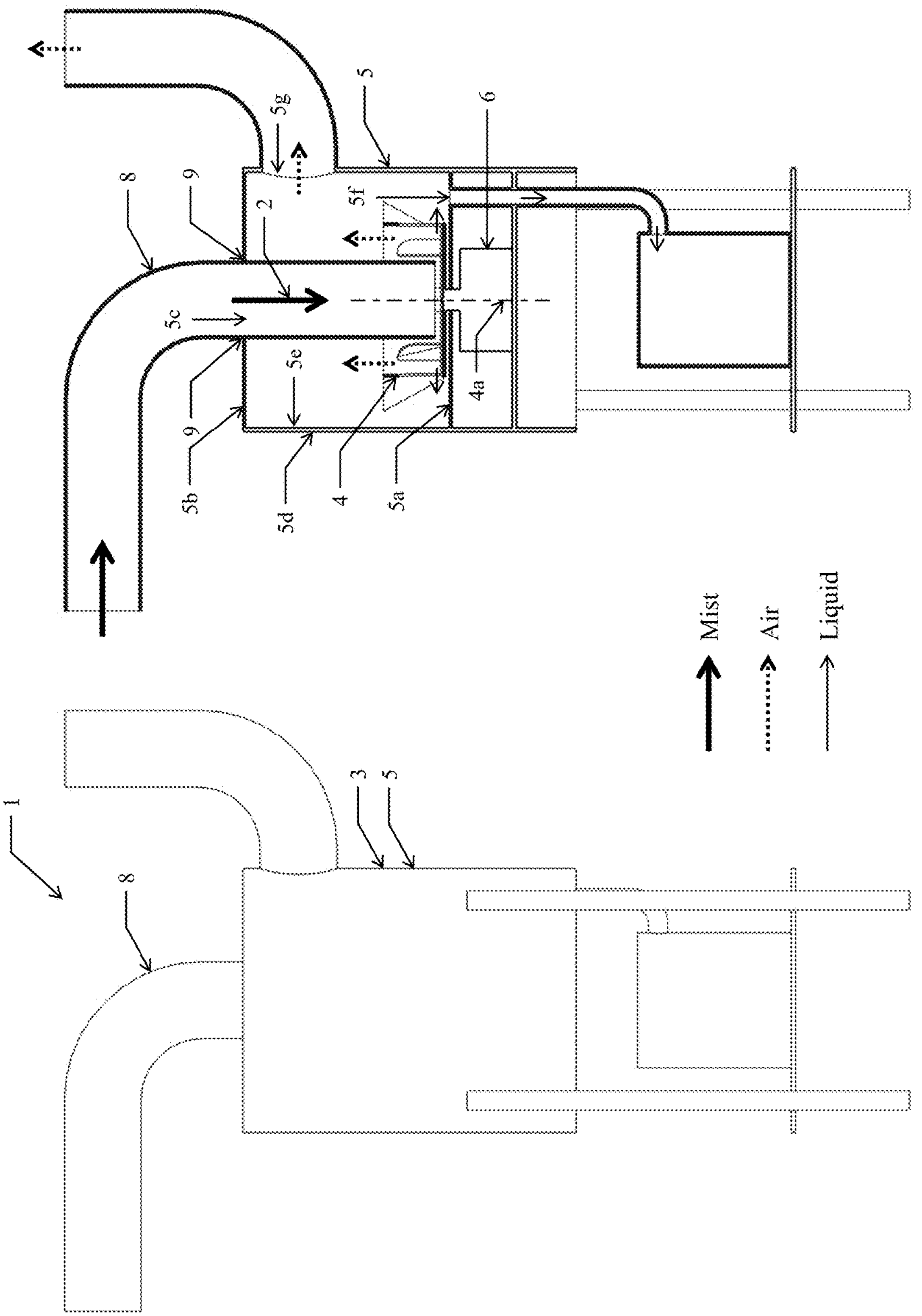
FIG. 2 is an elevation view and a cross-sectional view of the present invention.
Figure 3:
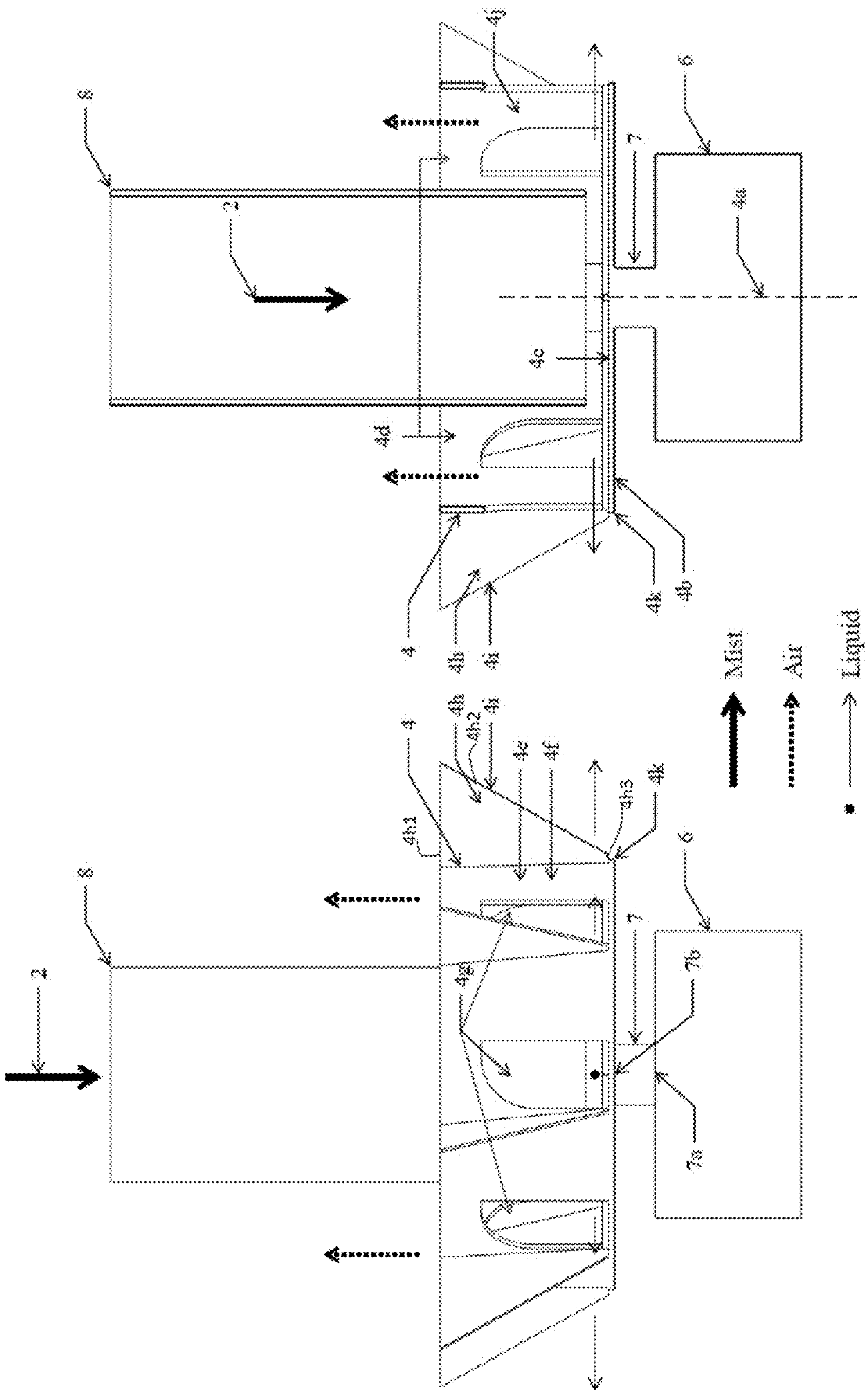
FIG. 3 is an elevation view and a cross-sectional view of the rotor, the mist collecting conduit, the electrical motor and the rotary shaft.
Figure 4:
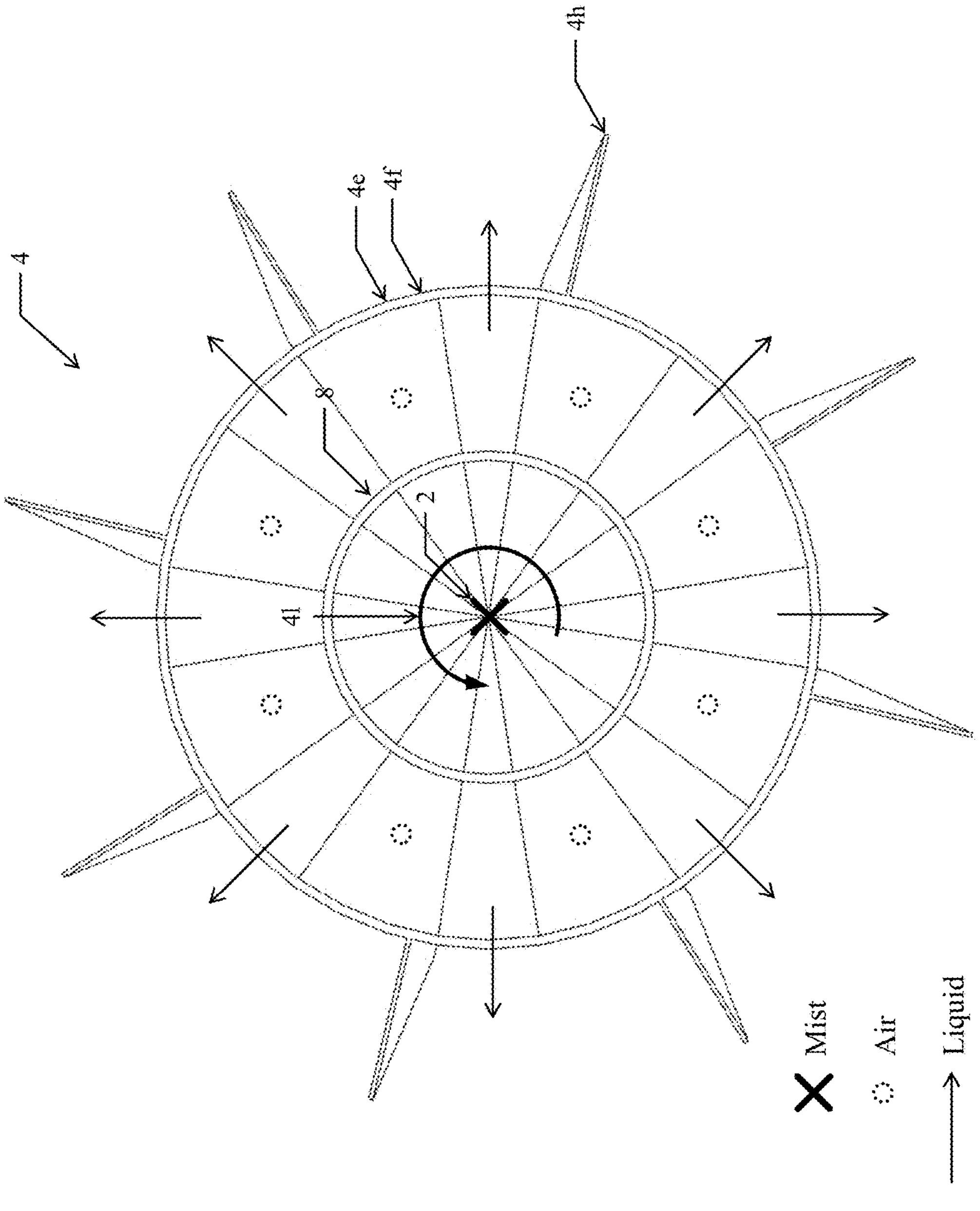
FIG. 4 is a plan view of the rotor and the mist collecting conduit.

As seen in FIGS. 1-4, the present invention is a mist collection and separation assembly 1 for improved operability and maintainability. The mist collection and separation assembly 1 comprises a mist separating system 3 that has a rotor 4 disposed within and concentric with a housing 5, the rotor 4 is configured to rotate about an axis of rotation 4*a*, an electrical motor 6 powers the rotor 4 through a rotary shaft 7, the rotary shaft 7 defines a proximal end 7*a* that is fixedly connected to the electrical motor 6 and a distal end 7*b* that is fixedly connected to the rotor 4, the rotor 4 has a rotor proximal surface 4*b*, a rotor distal opening 4*d* and a rotor lateral surface 4*e* curved about the axis of rotation 4*a* that collectively define a rotor interior cavity 4*j*, the rotor lateral surface 4*e* defines a set of apertures 4*g*, each aligned with a corresponding outer paddle 4*h*, each corresponding outer paddle 4*h* is a triangular structure that has top horizontal side wall 4*h*1, a bottom horizontal side wall 4*h*3, and a front side wall 4*h*2 that connects the top horizontal side wall 4*h*1 to the bottom horizontal side wall 4*h*3, the top horizontal side wall 4*h*1 has a larger length that the bottom horizontal side wall 4*h*3, the front side wall 4*h*2 tapers inward from the top horizontal side wall 4*h*1 to the bottom horizontal side wall 4*h*2 thereby causing each corresponding outer paddle 4*h* to diminish in size from a top horizontal side wall 4*h*1 of each corresponding outer paddle 4*h* to the bottom horizontal side wall 4*h*2 of each corresponding outer paddle 4*h*, the apertures 4*g* are positioned adjacent to a junction 4*k* between the rotor lateral surface 4*e* and the rotor proximal surface 4*b*, each corresponding outer paddle 4*h* is secured to and projects outwardly from an outer-facing side 4*f* of the rotor lateral surface 4*e*, each corresponding outer paddle 4*h* extends along the direction of and form an angle relative to the axis of rotation 4*a*, and they 4*h* are configured to generate suction through rotation, the housing 5 has a housing proximal surface 5*a*, a housing distal surface 5*b* with a housing distal opening 5*c* and a housing lateral surface 5*d* that collectively encase the rotor 4. And, a mist collecting conduit 8 that inserts into the mist separating system 3 through the housing distal opening 5*c* and extends along the axis of rotation 4*a* through the rotor distal opening 4*d* and into the rotor interior cavity 4*j* near an inner-facing side 4*c* of the rotor proximal surface 4*b*, an interface 9 between the mist collecting conduit 8 and the housing distal opening 5*c* is sealed. Wherein the mist collecting conduit 8 draws a mist 2, from a target environment 10 by suction generated through the rotation of the rotor 4 and delivers the mist 2 to the inner-facing side 4*c* of the rotor proximal surface 4*b*, the mist 2 impacts the inner-facing side 4*c* of the rotor proximal surface 4*b* and is forced to turn approximately 180 degrees, the velocity of the mist 2 results in a separated liquid being unable to follow this abrupt change in direction due to its higher specific weight, which leads to its effective separation from the air. Wherein the separated liquid is drained from the mist separating system 3 through at least one housing drainage port 5*f* while the air is exhausted through at least one housing exhaust port 5*g*. And, wherein the mist collection and separation assembly 1 is configured to operate filter-free.

In an embodiment of the present invention, the mist collection and separation assembly 1 is oriented vertically such that the mist 2 is drawn through the mist collecting conduit 8 and delivered to the inner-facing side 4*c* of the rotor proximal surface 4*b* downwardly, thereby enhancing the efficacy and efficiency of the mist separation process by utilizing the gravitational force of the Earth to assist in the separation of the liquid and potential particulate content from the air.

In another embodiment of the present invention, the inner-facing side 4*c* of the rotor proximal surface 4*b* is grooved to facilitate channeling the separated liquid and potential particulate content from the rotor interior cavity 4*j* through the apertures 4*g* defined along the rotor lateral surface 4*e*. The reason that the rotor proximal surface 4*b* is grooved is to facilitate the precipitate to immediately flow out of the rotor proximal surface 4*b*.

In another embodiment of the present invention, the rotor lateral surface 4*e* defines eight uniformly distributed apertures 4*g* aligned with corresponding outer paddles 4*h*.

In another embodiment of the present invention, the rotor 4 is of a cylindrical shape with an outer diameter of about 9 inches and a height of about 4 inches.

In another embodiment of the present invention, both the rotor 4 and the housing 5 are of a cylindrical shape.

In another embodiment of the present invention, the mist collecting conduit 8 extends to about 0.55 inches from the inner-facing side 4*c* of the rotor proximal surface 4*b*.

In another embodiment of the present invention, the mist collecting conduit 8 is a pipe with an outer diameter of about 4.33 inches and made of a hydraulic plastic.

In another embodiment of the present invention, the electrical motor 6 is rated at approximately ⅓ horsepower and configured for single-phase operation at 50 hertz.

In another embodiment of the present invention, the electrical motor 6 is configured for a rotational speed of approximately 3,000 revolutions per minute.

In another embodiment of the present invention, the rotor 4 rotates in a counterclockwise direction 4*l* and the outer paddles 4*h* form an angle relative to the axis of rotation 4*a* of approximately 5 degrees in the same direction as viewed from the housing 5 towards the axis of rotation 4*a*.

In another embodiment of the present invention, the mist separating system 3 is configured to maintain an inner-facing side Se of the housing lateral surface 5*d* in a wetted state during operation, such that liquid and potential particulate content that may accumulate on the inner-facing side 5*e* of the housing lateral surface 5*d* gradually and continuously drain from it 5*e*, thereby cleaning it 5*e* and further improving maintainability.

The outer paddles 4*h* define an angle that is about fifty degrees that generates a gradual downflow on the inner-facing side 5*e* of the housing lateral surface 5*d* that creates a cleaning effect.

In another embodiment of the present invention, the mist collection and separation assembly 1 includes at least one removable filter assembly along the mist collecting conduit 8 for improved reliability of the mist collection and separation assembly 1.

In yet another embodiment of the present invention, the mist collection and separation assembly include at least one removable filter assembly configured to filter the air either before or after it is exhausted through the at least one housing exhaust port 5*g* for improved reliability of the mist collection and separation assembly 1.

An advantage of the present invention is that it operates entirely without the need for filters. Unlike conventional systems that depend on replaceable filter elements, this invention eliminates the use of consumable components that require regular procurement and replacement. As a result, operational costs are significantly reduced, maintenance is simplified, and the system is less vulnerable to supply chain disruptions. The absence of filters also means there is no need for monitoring, cleaning, or replacing such elements, thereby enhancing overall convenience and reliability.

Another advantage of the present invention is its energy-efficient design. Conventional mist collection and separation systems often require motors rated at 1½ horsepower or higher to generate sufficient suction, particularly when operating with filters. In contrast, the present invention achieves effective mist separation using a motor rated at just ⅓ horsepower. This substantial reduction in power requirements leads to lower energy consumption, decreased operating expenses, and further simplification of maintenance procedures.

Another advantage of the present invention is its ability to generate negative pressure within the target environment, such as a machine room, during operation. This negative pressure effect causes a substantial inflow of clean air when the access door is opened, drawing air from behind and around the operator. This dynamic improves air quality within the workspace and enhances operator comfort and safety.

Still another advantage of the present invention is its self-cleaning capability, enabled by the circulating air within the mist separating system that maintains the inner-facing side of the housing lateral surface in a wetted state. Preferably constructed from hydraulic plastic, this surface captures submicron particles—such as smoke—through molecular adhesion as they contact the wetted surface. Over time, the condensed liquid drains downward, traversing and effectively cleaning the internal surfaces of the housing. Such self-cleaning effect is particularly enhanced when the mist collection and separation assembly is oriented vertically. This passive cleaning mechanism allows the equipment to operate for extended periods with minimal maintenance intervention.

The embodiments of the mist collection and separation assembly herein are exemplary and numerous modifications, combinations, variations, and rearrangements can be readily envisioned to achieve an equivalent result, all of which are intended to be embraced within the scope of the appended claims. Further, nothing in the above-provided discussions of the mist collection and separation assembly should be construed as limiting the invention to an embodiment or a combination of embodiments. The scope of the invention is defined by the description, drawings, and claims.

What is claimed is:

1. A mist collection and separation assembly comprises:

a mist separating system that has a rotor disposed within and concentric with a housing, the rotor is configured to rotate about an axis of rotation, an electrical motor powers the rotor through a rotary shaft, the rotary shaft defines a proximal end that is fixedly connected to the electrical motor and a distal end that is fixedly connected to the rotor, the rotor has a rotor proximal surface, a rotor distal opening and a rotor lateral surface curved about the axis of rotation that collectively define a rotor interior cavity, the rotor lateral surface defines a set of apertures, each aligned with a corresponding outer paddle, each outer paddle is a triangular structure that has top horizontal side wall, a bottom horizontal side wall, and a front side wall that connects the top horizontal side wall to the bottom horizontal side wall, the top horizontal side wall has a larger length than the bottom horizontal side wall, the front side wall tapers inward from the top horizontal side wall to the bottom horizontal side wall thereby causing each outer paddle to diminish in size from a top horizontal side wall of each outer paddle to the bottom horizontal side wall of each outer paddle, the apertures are positioned adjacent to a junction between the rotor lateral surface and the rotor proximal surface, each corresponding outer paddle is secured to and projects outwardly from an outer-facing side of the rotor lateral surface, each corresponding outer paddle extends along the direction of and form an angle relative to the axis of rotation, and each corresponding outer paddle is configured to generate suction through rotation, the housing has a housing proximal surface, a housing distal surface with a housing distal opening and a housing lateral surface that collectively encase the rotor; and a mist collecting conduit that inserts into the mist separating system through the housing distal opening and extends along the axis of rotation through the rotor distal opening and into the rotor interior cavity near an inner-facing side of the rotor proximal surface, an interface between the mist collecting conduit and the housing distal opening is sealed;

wherein the mist collecting conduit draws a mist, from a target environment by suction generated through the rotation of the rotor and delivers the mist to the inner-facing side of the rotor proximal surface, the mist impacts the inner-facing side of the rotor proximal surface and is forced to turn approximately 180 degrees, the velocity of the mist results in a separated liquid being unable to follow this abrupt change in direction due to its higher specific weight, which leads to its separation from the air;

wherein the separated liquid is drained from the mist separating system through at least one housing drainage port while the air is exhausted through at least one housing exhaust port; and wherein the mist collection and separation assembly is configured to operate filter-free.

2. The mist collection and separation assembly of claim 1, wherein the mist collection and separation assembly is oriented vertically such that the mist is drawn through the mist collecting conduit and delivered to the inner-facing side of the rotor proximal surface downwardly, thereby enhancing the efficacy and efficiency of the mist separation process by utilizing the gravitational force of the Earth to assist in the separation of the liquid and potential particulate content from the air.

3. The mist collection and separation assembly of claim 1, wherein the inner-facing side of the rotor proximal surface is grooved to facilitate channeling the separated liquid and potential particulate content from the rotor interior cavity through the apertures defined along the rotor lateral surface.

4. The mist collection and separation assembly of claim 1, wherein the rotor lateral surface defines eight uniformly distributed apertures aligned with corresponding outer paddles.

5. The mist collection and separation assembly of claim 1, wherein the rotor is of a cylindrical shape with an outer diameter of about 9 inches and a height of about 4 inches.

6. The mist collection and separation assembly of claim 1, wherein both the rotor and the housing are of a cylindrical shape.

7. The mist collection and separation assembly of claim 1, wherein the mist collecting conduit extends to about 0.55 inches from the inner-facing side of the rotor proximal surface.

8. The mist collection and separation assembly of claim 1, wherein the mist collecting conduit is a pipe with an outer diameter of about 4.33 inches and made of a hydraulic plastic.

9. The mist collection and separation assembly of claim 1, wherein the electrical motor is rated at approximately ⅓ horsepower and configured for single-phase operation at 50 hertz.

10. The mist collection and separation assembly of claim 1, wherein the electrical motor is configured for a rotational speed of approximately 3,000 revolutions per minute.

11. The mist collection and separation assembly of claim 1, wherein the rotor rotates in a counterclockwise direction and the outer paddles form an angle relative to the axis of rotation of approximately 5 degrees in the same direction as viewed from the housing towards the axis of rotation.

12. The mist collection and separation assembly of claim 1, wherein the mist separating system is configured to maintain an inner-facing side of the housing lateral surface in a wetted state during operation, such that liquid and potential particulate content that may accumulate on the inner-facing side of the housing lateral surface gradually and continuously drain from it, thereby cleaning it and further improving maintainability.

* * * * *